J. MURPHY.
DEVICE FOR WINDROWING BEANS.
APPLICATION FILED JUNE 17, 1918.
1,304,797.
Patented May 27, 1919.
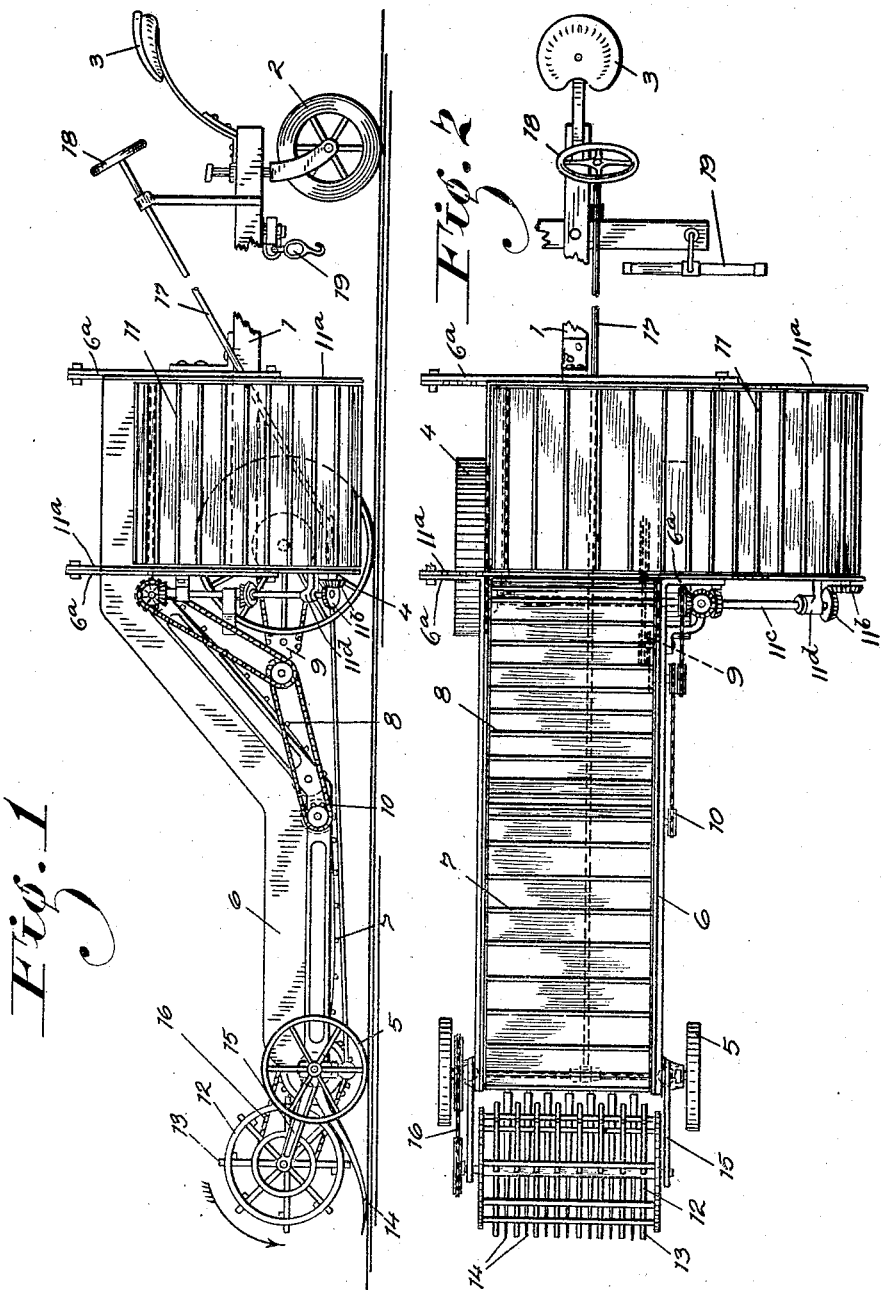
INVENTOR.
John Murphy
BY
ATTORNEY.

UNITED STATES PATENT OFFICE.

JOHN MURPHY, OF OAKLAND, CALIFORNIA.

DEVICE FOR WINDROWING BEANS.

1,304,797.  Specification of Letters Patent.  Patented May 27, 1919.

Application filed June 17, 1918. Serial No. 240,304.

*To all whom it may concern:*

Be it known that I, JOHN MURPHY, a subject of Great Britain, residing at Oakland, in the county of Alameda and State of California, have invented certain new and useful Improvements in Devices for Windrowing Beans; and I do declare the following to be a clear, full, and exact description of the same, reference being had to the accompanying drawings, and to the characters of reference marked thereon, which form a part of this application.

This invention relates to improvements in harvesting machines and particularly to a type suitable for a quicker and more efficient means of windrowing bean vines for the thresher to operate on than at present.

The operation of placing the thin windrows of vines into suitable windrows or heaps for the threshing machines is at present done by hand, laborers going along the cut rows, and forking the vines from one windrow over onto another until a pile suitably large for the thresher to work on is assembled. The principal object of my present invention is to eliminate all manual labor in this regard with the exception of the services of one man, who is necessary to drive the horses or run the engine propelling my machine, thus reducing considerably the expense of harvesting the crop, and at the same time conserving man power.

A further object of the invention is to produce a simple and inexpensive device and yet one which will be exceedingly effective for the purposes for which it is designed.

These objects, I accomplish by means of such structure and relative arrangement of the parts as will fully appear by a perusal of the following specification and claim.

On the drawings, similar characters of reference indicate corresponding parts in the several views:

Figure 1 is a side elevation of my machine, partly broken out at one end.

Fig. 2 is a top plan view of the same.

Referring now more particularly to the characters of reference on the drawings, the numeral 1 designates the frame of the machine, at the rear end of which is pivoted a single steering wheel 2 which in the case of a horse driven machine is swiveled loosely, or in the case of an engine-driven machine may be suitably connected up with a hand steering wheel which would be located near the driver's seat 3 on said frame. A suitable distance forward of said steering wheel are two driving wheels 4, suitably spaced apart, while the extreme forward end of the frame 1 is carried on two smaller wheels 5. Located between said pairs of wheels, and extending lengthwise the necessary distance, are containing walls 6, between which are slatted endless conveyers 7 and 8, the same being made of canvas or similar material. The top surfaces of these conveyers travel in a reverse direction from that of the machine itself, and are driven by means of gearing 9 from the main wheels 4, and from thence to chain sprocket drives 10 located outside said containing walls 6. Conveyer 7 is placed parallel with the ground, while the conveyer 8 is inclined to deliver its load upon a third conveyer 11 placed crosswise of said machine, and located about over said wheels 4, and adapted to deliver its load to one side of the path of travel of the machine. This conveyer 11 is also operated by driving mechanism similar to that driving the conveyers 6 and 7, and may be arranged to slide back and forth lengthwise of its own travel so that its load may be deposited on the ground nearer or farther from the machine as may be desired, depending on the spacing of the windrows which are being piled, the desire being to pile the vines being taken during a trip across the field directly on top of the next windrow already lying there, thus saving the time and labor which would be necessary to move all the rows.

This is accomplished by having the frame 11$^a$ of the conveyer 11 slidable between right angle extensions 6$^a$ of the walls 6, said frame 11$^a$ being adjustably secured to the extensions 6$^a$. The conveyer 11$^a$ is operated by bevel gears 11$^b$ slidably mounted on a spline on the shaft 11$^c$, which is an extension, suitably driven, from one of the shafts of the chain drive 10.

A bearing 11$^d$ secured to the frame 11 holds the slidable gear always in mesh with the other gear, and the same is turnable on the shaft by reason of the spline thereon no matter what position the conveyer 11 may be shifted.

Swivelly mounted at the front of the frame 1 is a cylindrical roller or framework 12 extending across the width of the conveyer 7, equipped with a plurality of teeth or prongs 13 extending radially therefrom. Below said roller 12 is a plurality of pointed prongs 14, closely spaced, rigidly secured to said frame 1 so that the pointed ends thereof will just clear the ground. The roller 12 is connected to the frame 1 by means of arms 15, pivoted thereto and is connected by means of a direct chain drive 16 to the front wheels 5 in such a ratio as to give a greater speed to this roller 12 than the wheels 5 themselves have. Vertical movement for adjustment purposes is given to this roller 12 by means of suitably connected means 17, which terminate in a hand wheel 18 near the seat 3.

Should horses be used as tractive power, double trees 19 are attached to the frame 1 just forward of the wheel 2, the length of said frame at this point being sufficient to permit of the length of a horse between said double trees 19 and the wheels 4. Should a gas engine or similar power be used, it may be located on the frame 1 just forward of the driver's seat and said frame may then be shortened considerably.

The operation is as follows: The machine is started at the head of a windrow which has previously been cut down and left where cut, as is the present practice. The prongs 14 lift the vines from the ground, while the toothed rollers 12—13 push them along between said prongs 14 and said roller until they come in contact with the conveyer 7 which takes and delivers them to the succeeding conveyers 8 and 11, which latter deposits them on the ground on top of the vines of the row next to that being handled at this time. At the end of the row or field, the machine is turned, and run over the windrow next to that upon which the previous cuttings were dumped, upon which the windrow now being operated on is also placed.

Thus, it will be seen that with this machine I have formed windrows of bean vines or similar produce composed of three windrows as planted or cut, thus insuring a suitable amount for the thresher to pick up when driven along.

The speed with which these operations may be performed depend solely upon that of the horses or engine used, and with only the labor of one man. It is thus apparent that I have produced such a device as will accomplish in an efficient and economical way the objects of the invention as set forth.

While this specification sets forth in detail the present and preferred construction of the device, still in practice, such deviations from such detail may be resorted to as do not form a departure from the spirit of the invention, as defined by the appended claim.

Having thus described my invention, what I claim as new and useful and desire to secure by Letters Patent is:—

The combination with a frame having a plurality of supporting wheels and a series of conveyer belts arranged between the wheels and running lengthwise of the frame, of a plurality of curved prongs mounted rigidly to the frame and just clearing the ground, being positioned to project just forward of the foremost ones of said supporting wheels, a revoluble toothed roller mounted above the prongs on arms pivotally secured to the frame and means for vertically adjusting it relative to the prongs, whereby the bean vines raked up by the prongs and roller are delivered to the conveyer belts.

In testimony whereof I affix my signature, in presence of two witnesses.

JOHN MURPHY.

Witnesses:
VERADINE WARNER,
BERNARD PUIAT.

Copies of this patent may be obtained for five cents each, by addressing the "Commissioner of Patents, Washington, D. C."